United States Patent [19]

Sawada et al.

[11] Patent Number: 5,438,471
[45] Date of Patent: Aug. 1, 1995

[54] TAPE CASSETTE HAVING A PIVOTABLY MOVABLE MAIN LID AND A GUIDABLY MOVABLE TOP LID

[75] Inventors: Takashi Sawada; Shuichi Ota, both of Kanagawa, Japan

[73] Assignee: Sony Corporation, Tokyo, Japan

[21] Appl. No.: 205,382

[22] Filed: Mar. 4, 1994

[30] Foreign Application Priority Data

Mar. 5, 1993 [JP] Japan .................. 5-069097

[51] Int. Cl.⁶ ............................................. G11B 23/02
[52] U.S. Cl. ................................................ 360/132
[58] Field of Search ........................................ 360/132

[56] References Cited

U.S. PATENT DOCUMENTS

| 4,672,497 | 6/1987 | Ueda . |
| 4,807,077 | 2/1989 | Zaitsu .................. 360/132 |
| 5,225,954 | 7/1993 | Kondo .................. 360/132 |

FOREIGN PATENT DOCUMENTS

| 0323101 | 7/1989 | European Pat. Off. . |
| 2229160 | 9/1990 | European Pat. Off. . |
| 0452008 | 10/1991 | European Pat. Off. . |
| 0502505 | 9/1992 | European Pat. Off. . |

OTHER PUBLICATIONS

Patent Abstracts of Japan vol. 7, No. 150 (P-207) (1295) 30 Jun. 1983, JP-A-58 060 475 (Sony K.K.) 9 Apr. 1983 *abstract*.

Primary Examiner—A. J. Heinz
Attorney, Agent, or Firm—William S. Frommer; Alvin Sinderbrand

[57] ABSTRACT

A tape cassette including a cassette case having a pair of tape reels having a recording tape wound therebetween and having an opening for providing access to the recording tape; a main lid pivotably mounted on opposite side faces of the cassette case; a top lid pivotably mounted on the main lid; and a guide apparatus. Upon opening or closing the main lid so as to provide access to the magnetic tape, the top lid is respectively moved rearwardly from a position in which the top lid covers an upper portion of the opening or forwardly so as to cover the upper portion of the opening. The guide apparatus guides the top lid during such movement thereof so as to avoid sliding or rubbing of a lower face of the top lid on an upper face of the cassette case.

11 Claims, 17 Drawing Sheets

TAPE CASSETTE HAVING A PIVOTABLY MOVABLE MAIN LID AND A GUIDABLY MOVABLE TOP LID

FIELD OF THE INVENTION

The present invention relates to a tape cassette and, more particularly, to a tape cassette having a cassette case with a recording tape contained therein and a pivotably movable main lid and top lid for covering and uncovering at least a portion of an opening in the cassette case so to provide access to the recording tape.

Description of the Related Art

A tape cassette for use with a recording/reproducing apparatus has recently been proposed having a cassette case with a mouth or opening formed in the front of the cassette case through which a tape drawing out member of the recording/reproducing apparatus may be inserted upon installation of the tape cassette therein. Such tape cassette includes a main lid and a top lid for respectively covering a front and a top portion of the opening. An example of one of these tape cassettes is illustrated in FIGS. 24 and 25.

More specifically, FIGS. 24 and 25 illustrate a tape cassette a including a cassette case b which contains therein a pair of rotatably mounted tape reels d having a magnetic tape c wound therebetween. A pair of tape exits e are formed at opposite left and right end portions of the front of the cassette case b. A mouth or opening f is formed between the tape exits e.

Unless otherwise specifically mentioned, in describing the tape cassette a, the front of the tape cassette shall be defined as the portion having a main lid g, the back or rear of the tape cassette shall be defined as the portion opposite the front, and the top portion shall be defined as the portion having a top lid j.

The tape cassette a further includes the main lid g having a front portion h and a pair of side portions i. The front portion h has a size which is sufficient to cover the front of the cassette case b. The side portions i extend in a rearward direction from opposite left and right ends of the front portion h. The side portions i are pivotably supported on side faces of a front end portion of the cassette case b so as to support the main lid g in upward and downward pivotal motion at the front end portion of the cassette case b between a closed position (see FIG. 24), in which the main lid closes the front of the cassette case b, and an opened position (see FIG. 25), in which the main lid is opened so as to expose or provide access to the front of the cassette case b.

The tape cassette a further includes a top lid j having a plate-like form with a length smaller than that of the main lid g. The top lid j is pivotably supported at opposite left and right end portions of a front end portion thereof by an upper end portion of the main lid g so as to be moved therewith.

A pair of biasing means (not shown) are provided at opposite end portions of each of the main lid g and the top lid j for exerting biasing forces thereon so as to cause the same to pivotably move in the closing direction.

Upon inserting the tape cassette a into a recording/reproducing apparatus (not shown), the tape cassette is mounted onto a cassette loading section therein. During such mounting of the tape cassette a, the main lid g is pivoted towards the opened position, the upper end portion of the main lid to which the top lid j is supported is moved rearwardly while being displaced slightly in an upward direction, and the top lid j is opened or moved rearwardly while sliding on an upper surface of the cassette case b. As a result, at least the front of the opening f is exposed, thereby exposing the magnetic tape c so as to enable access thereto by the recording/reproducing apparatus.

A shutter k is slidable mounted on a side of the cassette case b so as to slide in the forward and backward directions within a range of movement. When the tape cassette a is not being used, such as in the recording/reproducing apparatus, the shutter k is positioned at a front end of the movement range so as to close or cover the side and/or bottom of the opening f, as shown in FIG. 24. On the other hand, when the tape cassette a is being used, such as in the recording/reproducing apparatus, the shutter k is moved to a rear end of the movement range so as to open or expose the side and/or bottom of the opening f, as shown in FIG. 25.

As a result, at least part of the front, top and side of the opening f are exposed when the tape cassette a is utilized by, for example, the recording/reproducing apparatus.

The related art is disclosed in European Patent Application Publication Number 0,558,323, published on Sep. 1, 1993.

When the top lid j of the above-described tape cassette a is moved so as to be opened or closed, the top lid slides on or rubs the upper surface of the cassette case b. As is to be appreciated, such sliding or rubbing may damage the upper surface of the cassette case b and/or a lower surface of the top lid j. Such damage may adversely affect the relative sliding movement between the cassette case b and the top lid j so as to adversely affect the smooth opening or closing of the main lid g and top lid j.

Further, the sliding or rubbing of the top lid j on the upper surface of the cassette case b may produce a powder-like substance which may fall through the opening f and onto the magnetic tape c. As a result, a signal dropout or similar such problem may be produced.

OBJECTS AND SUMMARY OF THE INVENTION

An object of the present invention is to provide a tape cassette which overcomes the above-described problems associated with the related art.

More specifically, it is an object of the present invention to provide a tape cassette having cassette case and a movable top lid, in which the top lid may be moved without damaging an upper surface of the cassette case and/or a lower surface of the top lid.

Another object of the present invention is to provide a tape cassette as aforesaid wherein the top lid may be moved without producing a powder-like substance which may be produced by rubbing or sliding contact between the cassette case and the top lid.

In accordance with an aspect of this invention, a tape cassette for use with a recording/reproducing apparatus is provided. The tape cassette includes a pair of tape reels having a recording tape wound therebetween; and a cassette case holding the pair of tape reels therein and having an opening for providing access to the recording tape. The tape cassette further includes a main lid pivotably mounted on opposite side faces of the cassette case for covering at least a front portion of the opening when the main lid is in a closed position and exposing the at least front portion of the opening when the main lid is in an open position. The tape cassette still further includes a top lid pivotably mounted on the main lid so as to be movable therewith. The top lid is located so as to cover an upper portion of the opening when the main lid is in the closed position and is located substantially on top of an upper surface of the cassette case when the main lid is in the opened position. The tape cassette further includes a guide device arranged in the cassette case for guiding the top lid over the upper surface of the cassette case when the main lid is opened and closed so as to prevent an inner surface of the top lid from contacting the upper surface of the cassette case. The recording tape is accessible when the main lid is in the opened position and is substantially covered when the main lid is in the closed position.

In the present tape cassette, the position of the top lid during an opening or closing movement is controlled by a guide device provided at a front end portion of the cassette case so that a lower portion of the top lid is prevented from contacting the cassette case. As a result, damage to an upper surface of the cassette case and/or a lower surface of the top lid, which may otherwise be caused by the sliding or rubbing contact between such surfaces, may be avoided. Further, the forming or production of a powder-like substance, which may be produced by the rubbing or sliding between the cassette case and the top lid, is avoided.

Other objects, features and advantages according to the present invention will become apparent from the following detailed description of illustrated embodiments when read in conjunction with the accompanying drawings in which corresponding components are identified by the same reference characters.

DETAILED DESCRIPTION OF THE PREFERRED EMBODIMENTS

A tape cassette 1 according to a first embodiment of the present invention will now be described with reference to FIGS. 1 to 18.

Figure 1:
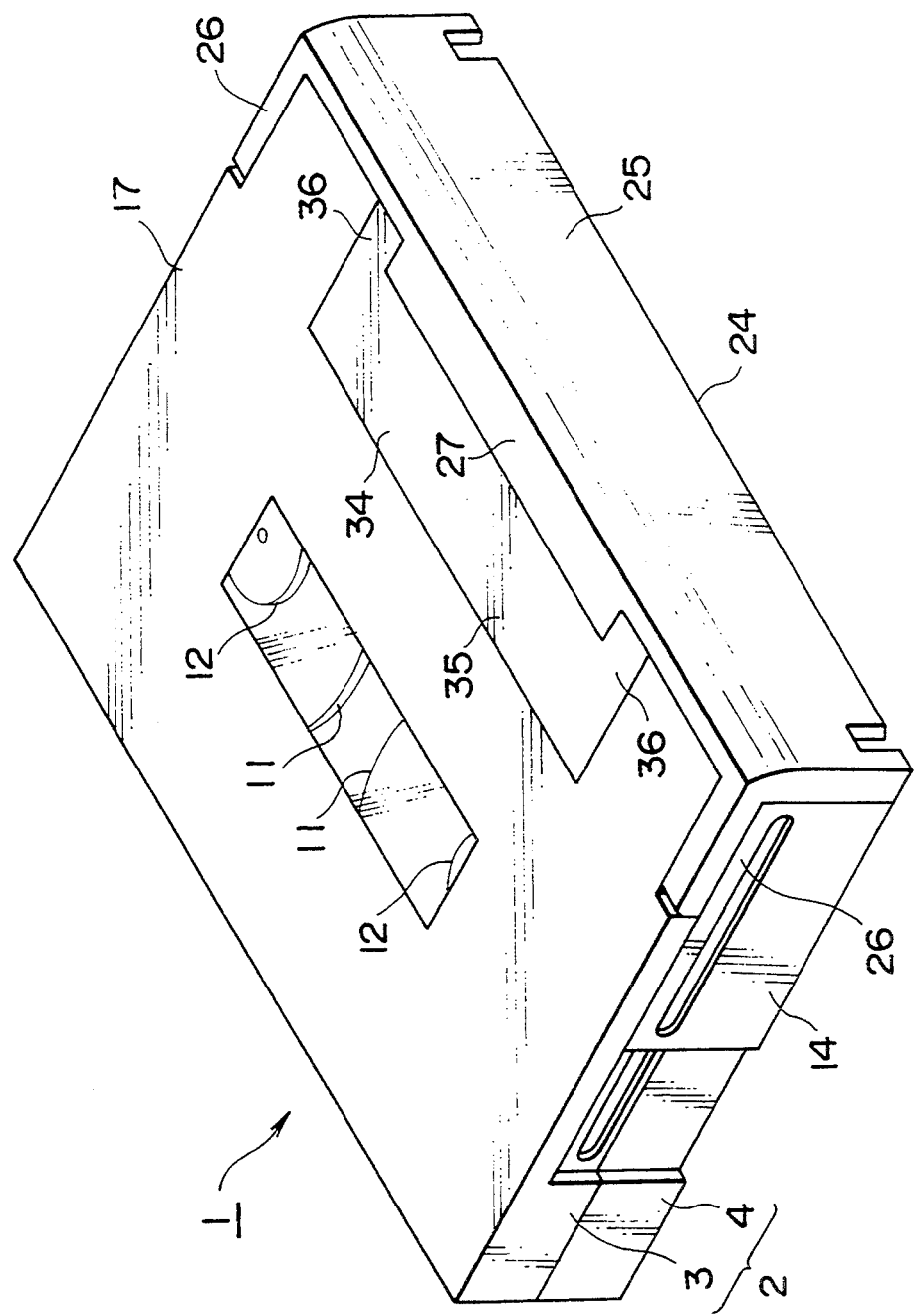
FIG. 1 is a perspective view of a tape cassette having a main lid and a top lid arranged in their respective closed positions in accordance with a first embodiment of the present invention.
Figure 2:
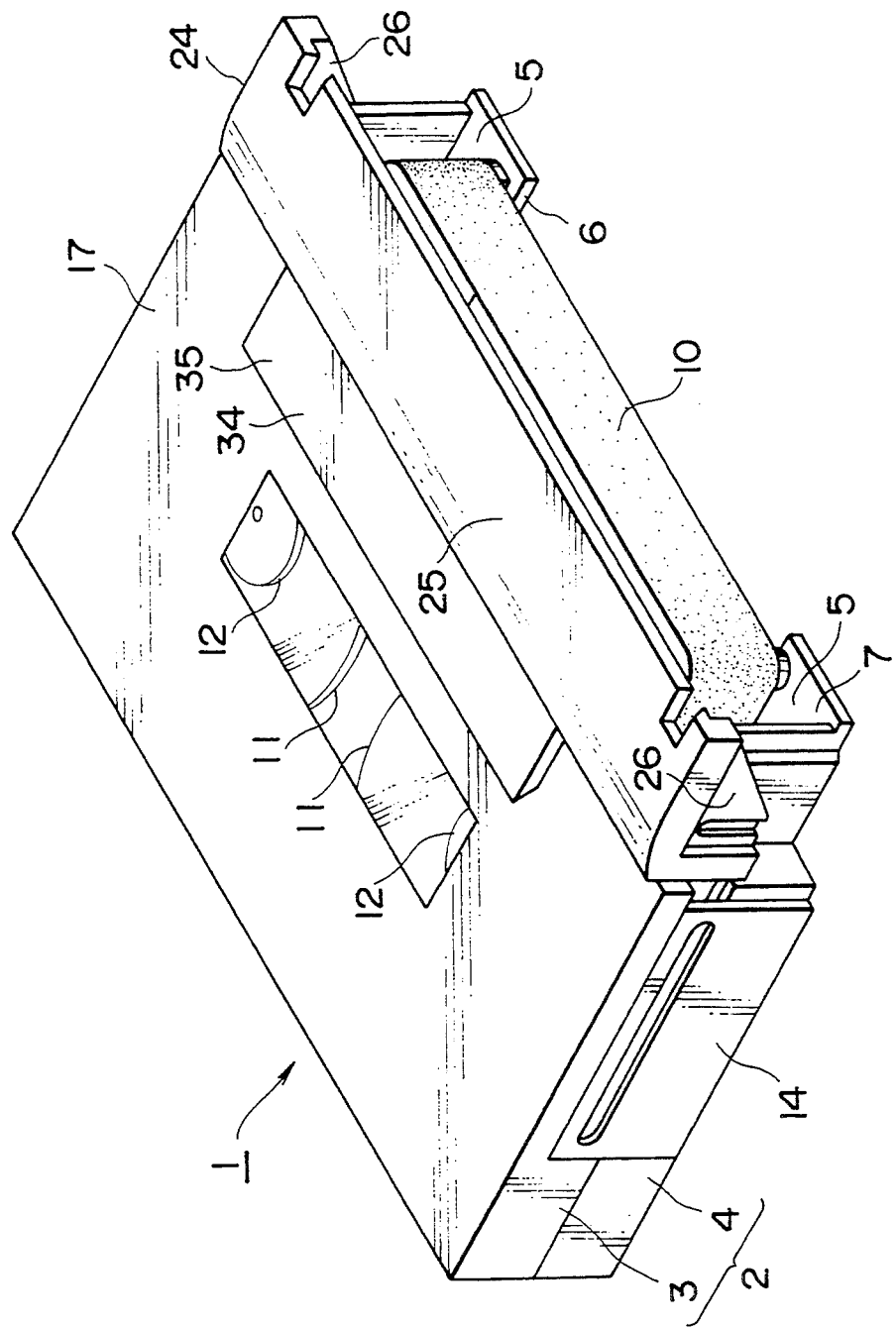
FIG. 2 is a perspective view of the tape cassette of FIG. 1 with the main lid and the top lid in their respective opened positions.

As shown, for example, in FIGS. 1 and 2, the tape cassette 1 includes a cassette case 2 which, in turn, includes an upper shell 3 and a lower shell 4 each having a tray-like form. The upper and lower shells 3 and 4, respectively, are coupled to each other with openings in each shell being opposed to each other so as to form the cassette case 2. Such cassette case 2 may have a box-like profile, that is, an elongated rectangle (as viewed from above or below the cassette case) having a relatively small thickness in an upward and downward direction.

As shown, for example, in FIG. 2, a pair of tape exits 5 are formed at opposite left and right end portions of a front wall of the cassette case 2. A mouth or opening 6 is formed between the tape exits 5 in the front wall of the cassette case 2. Such opening 6 provides access to a magnetic tape 10 as hereinafter more fully described.

Figure 3:
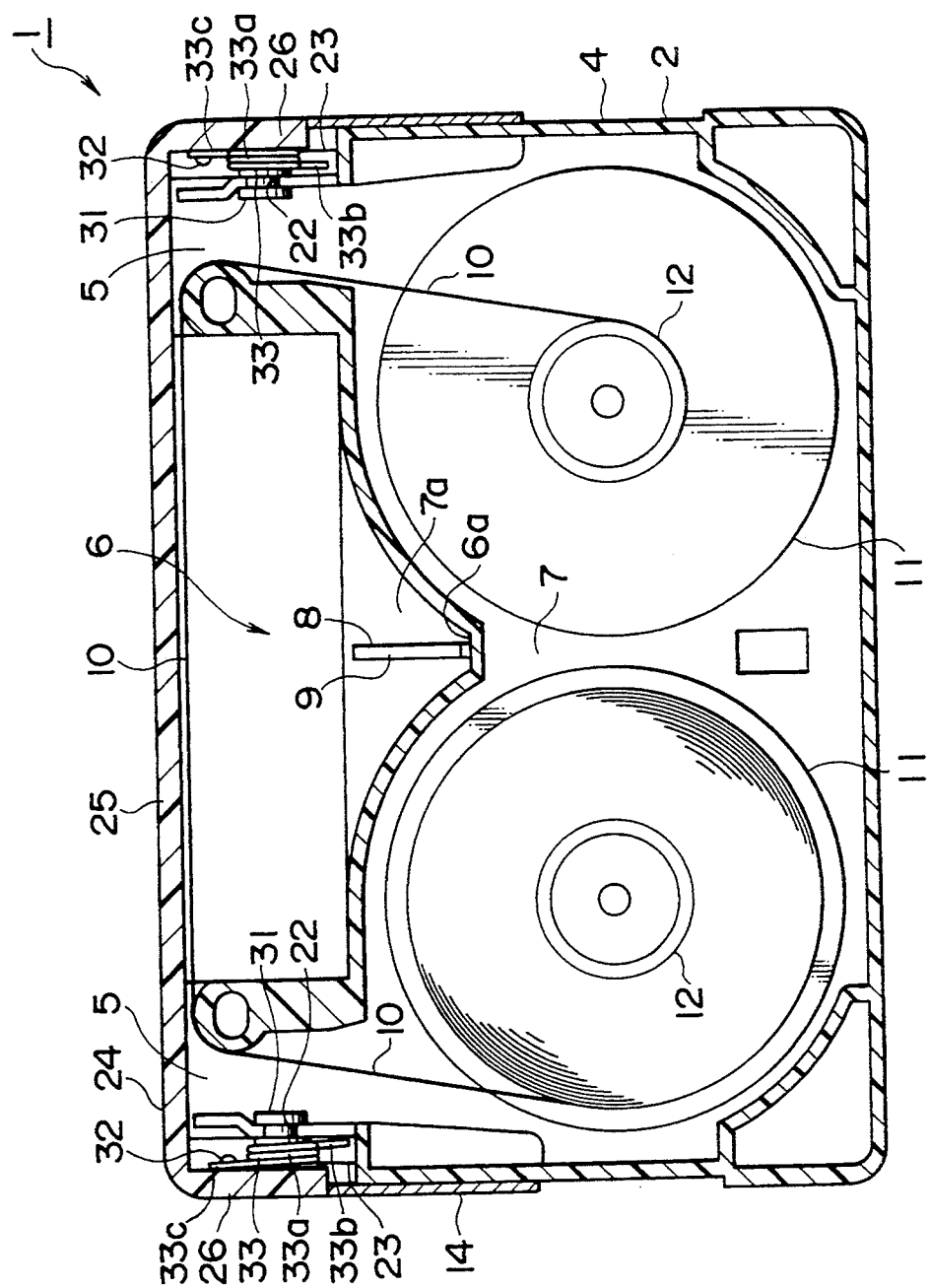
FIG. 3 is a horizontal sectional view of the tape cassette of FIG. 1.

A portion of the front wall of the cassette case 2, which defines an interior face of the mouth 6, is slightly recessed in a rearward direction at a central portion thereof so as to form a shallow V-shaped recess 6a as shown, for example, in FIG. 3. As shown therein, the recess 6a opens in a forward direction.

Unless otherwise specifically stated, the forward direction will be defined as towards the front of the cassette 1 (i.e., the portion thereof having, for example, the opening 6 and a main lid 25), whereas the rearward direction will be defined as being opposite the forward direction (i.e., away from the front of the cassette 1 in a perpendicular direction thereto).

Figure 4:
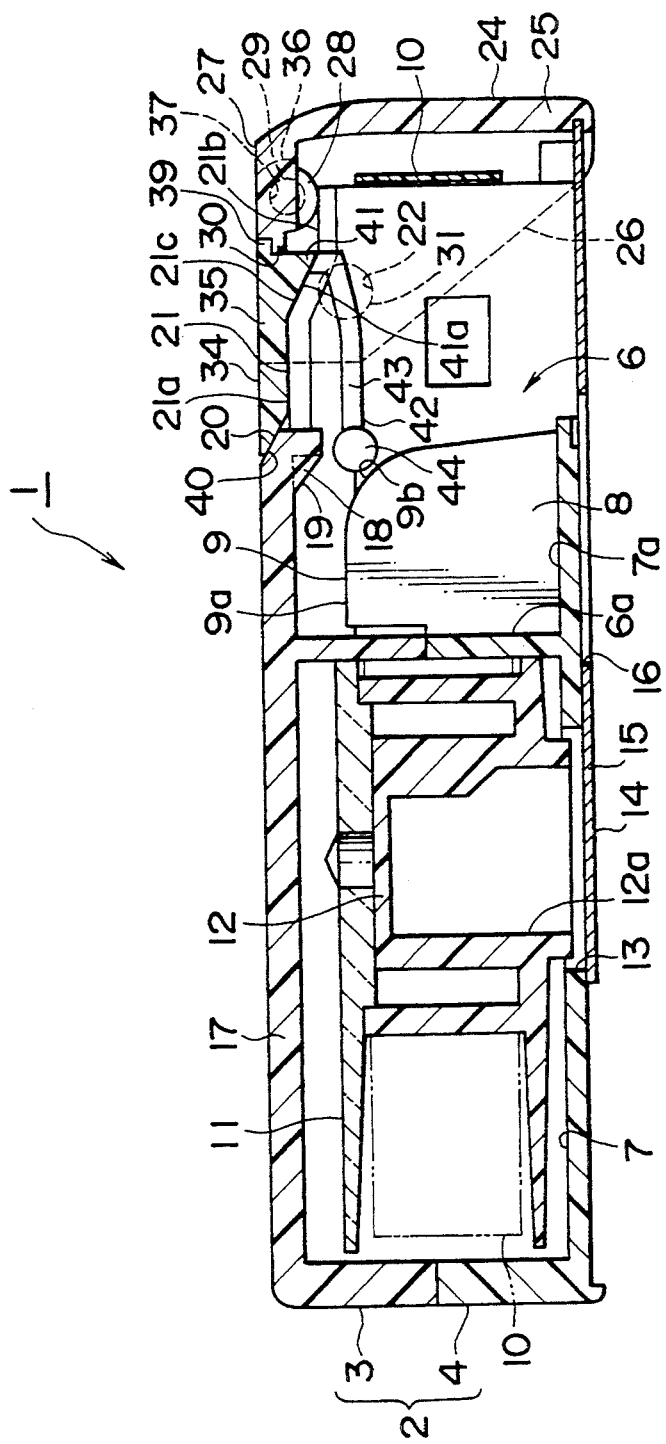
FIG. 4 is an enlarged sectional view of the tape cassette of FIG. 1 with the main lid and the top lid in their respective closed positions.

As shown, for example, in FIGS. 2–4, the lower shell 4 of the cassette case 2 has a bottom wall 7. Such bottom wall 7 extends in the forward direction beyond the front wall of the cassette case 2 at a portion thereof corresponding to the recess 6a so as to form a shelf portion 7a which covers the bottom of the recess 6a (see, for example, FIG. 4).

As shown, for example, in FIGS. 4–7 and 10–11, a cam plate 8 is formed in the lower shell 4. Such cam is arranged so as to extend in an upright manner and in a forward/backward direction from a central portion of the shelf portion 7a. The cam plate 8 has an upper edge which is adapted to function as a cam edge 9. The cam edge 9 extends in a substantially horizontal manner at a rear portion 9a thereof, while a remaining front portion 9b has an arc-like shape which is displaced downwardly and towards the front of the cassette 1. The rear portion 9a comprises approximately two-thirds of the cam edge 9, whereas the front portion 9a comprises approximately one-third of the cam edge.

A pair of tape reels 11 are rotatably respectively mounted on a pair of reel hubs 12 within the cassette case 2 as shown, for example, in FIGS. 1–4. Opposite ends of the magnetic tape 10 are respectively fixed to the tape reels 11 and the magnetic tape is wound therebetween. When the tape cassette 1 is not being used with a recording/reproducing apparatus (not shown) or other similar apparatus, the magnetic tape 10 is positioned along the front of the opening 6. However, when the tape cassette 1 is being used by such apparatus, the magnetic tape 10 may be partially led outside of the cassette case 2 through the tape exits 5 by the apparatus.

A reel spindle engaging hole 12a is formed in each reel hub 12 so as to be opened at the bottom thereof. Each of the reel spindle engaging holes 12a is exposed to the outside through a reel spindle fitting hole 13 formed in the bottom wall 7 of the cassette case 2, as shown, for example, in FIG. 4.

The tape cassette 1 further includes a shutter 14 as shown, for example, in FIGS. 1 and 2. The shutter 14 is slidably supported on the bottom of the cassette case 2 so as to enable movement thereat within a predetermined range and has a pair of exposing holes 16 formed in a bottom wall 15 thereof (see, for example, FIGS. 4 and 6). When the shutter 14 is at a front end of the range (that is, at its closed position), as shown in FIGS. 1 and 4, a front end portion of the bottom wall 15 covers the bottom of the opening 6, the exposing holes 16 are positioned so as to be out of alignment with the reel spindle fitting holes 13 of the cassette case 2, and a rear end portion of the bottom wall 15 covers the reel spindle fitting holes 13. On the other hand, when the shutter 14 is at a rear end of the range (that is, at its opened position), as shown in FIGS. 2 and 6, the front edge of the bottom wall 15 is positioned rearwardly of the rear end of the opening 6 so as to expose or uncover the bottom of the opening 6, and the exposing holes 16 are positioned so as to be aligned with the reel spindle fitting holes 13 of the cassette case 2 so as to expose the reel spindle engaging holes 12a of the tape reels 11 to the outside.

Figure 5:
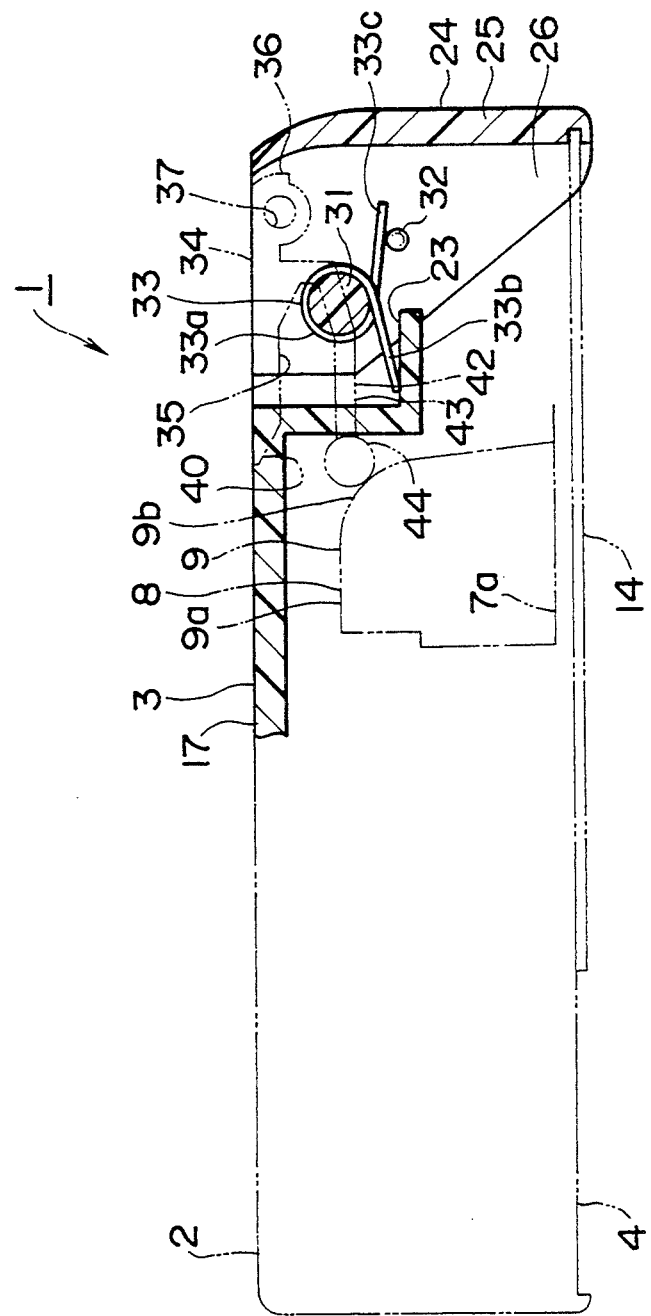
FIG. 5 is a partial enlarged sectional view of the tape cassette of FIG. 1 with the main lid and the top lid in their respective closed positions.
Figure 6:
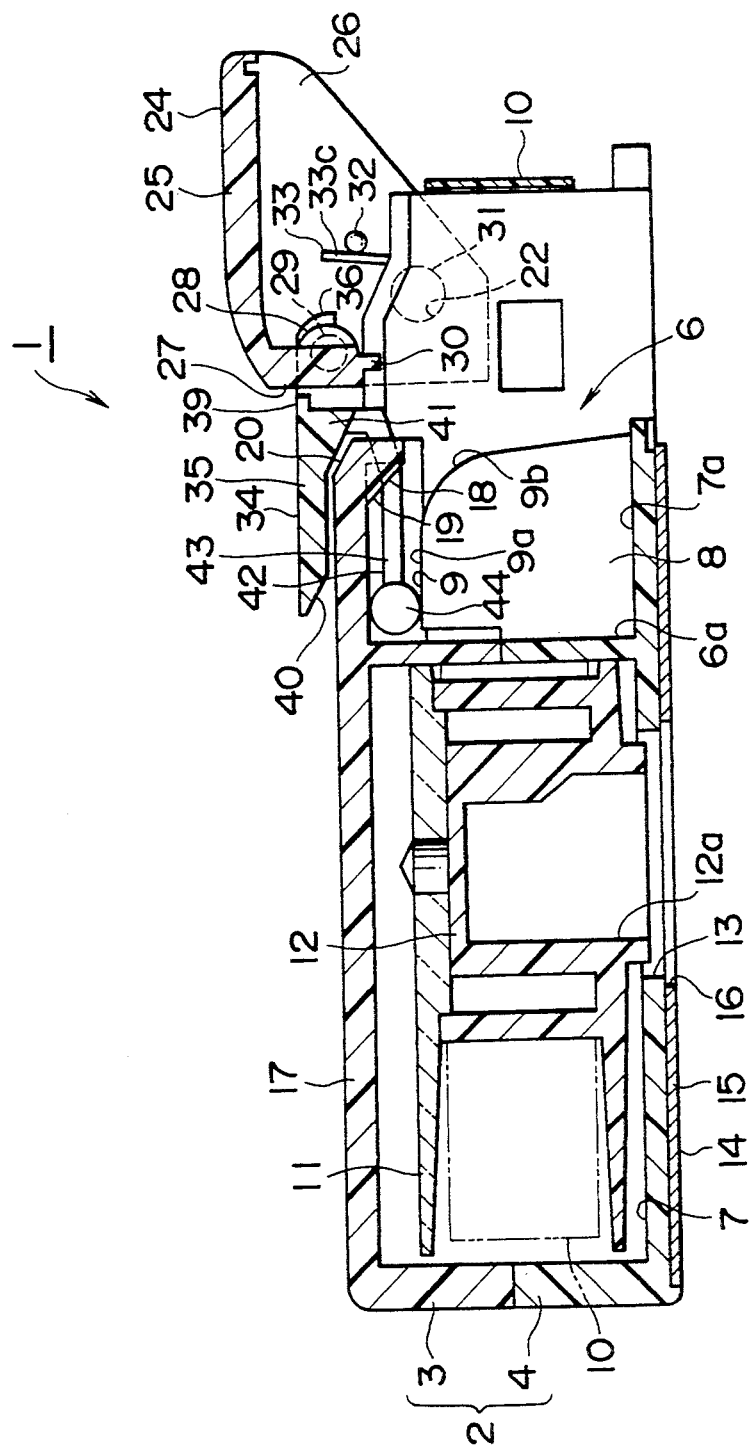
FIG. 6 is an enlarged sectional view of the tape cassette of FIG. 1 with the main lid and the top lid in their respective opened positions.
Figure 7:
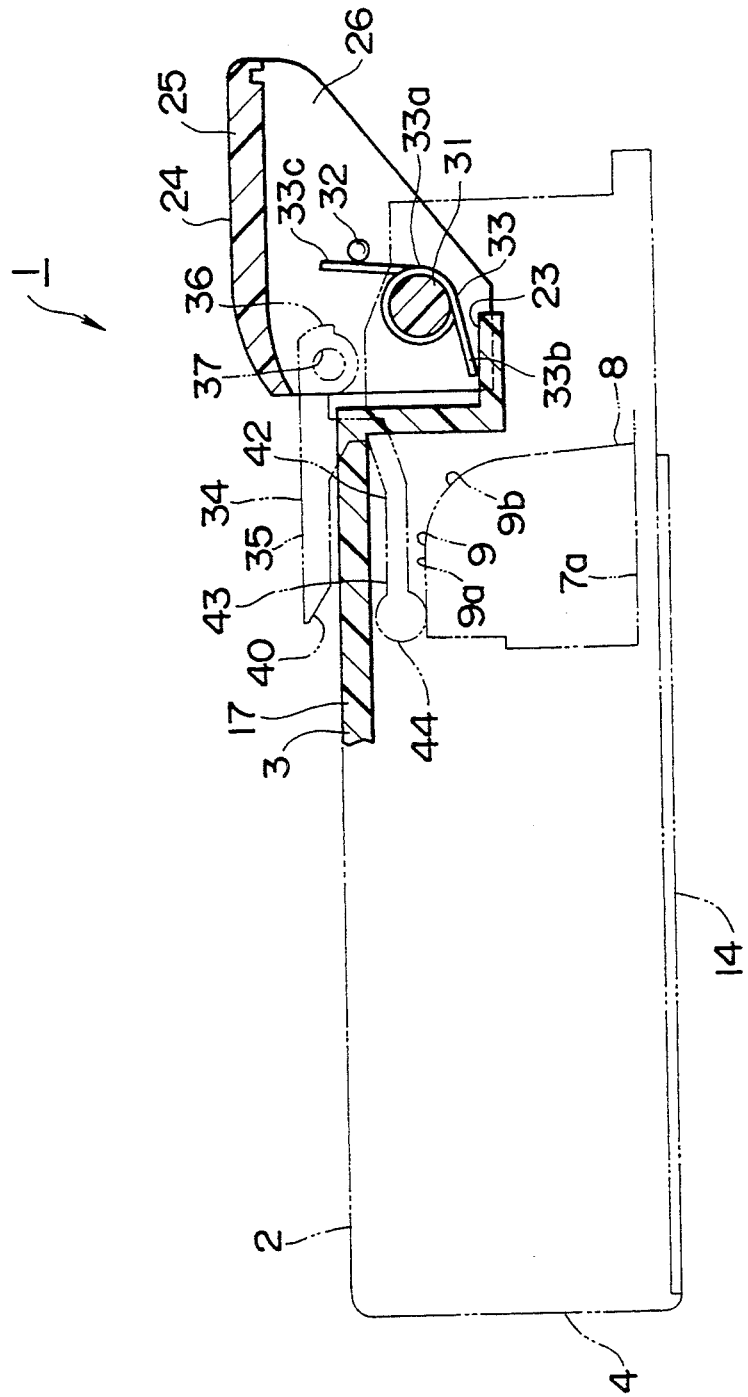
FIG. 7 is a partial enlarged section view of the tape cassette of FIG. 1 with the main lid and the top lid in their respective opened positions.

As shown, for example, in FIGS. 5, 6 and 7, the upper shell 3 includes a top wall 17 having a cam portion 18. More specifically, the cam portion 18 is formed at a substantially central portion of a lower face of a front end portion of the top wall 17. The cam portion 18 may have a rib-like form which projects or extends in an upward/downward direction as shown in FIG. 6. The cam portion has a lower edge 19 which is inclined in an upward/downward direction as shown, for example, in FIG. 6. Such lower edge 19 is adapted to function as a cam edge.

The upper shell 3 further includes an upper face 20 formed at a front end portion thereof which is adjacent to the opening 6. The upper face 20 is inclined in a forward/downward direction as, for example, shown in FIGS. 4 and 6. The inclination angle of the inclined face 20 may be rather moderate and may be less than the inclination angle of the cam edge 19 of the cam portion 18.

Figure 8:
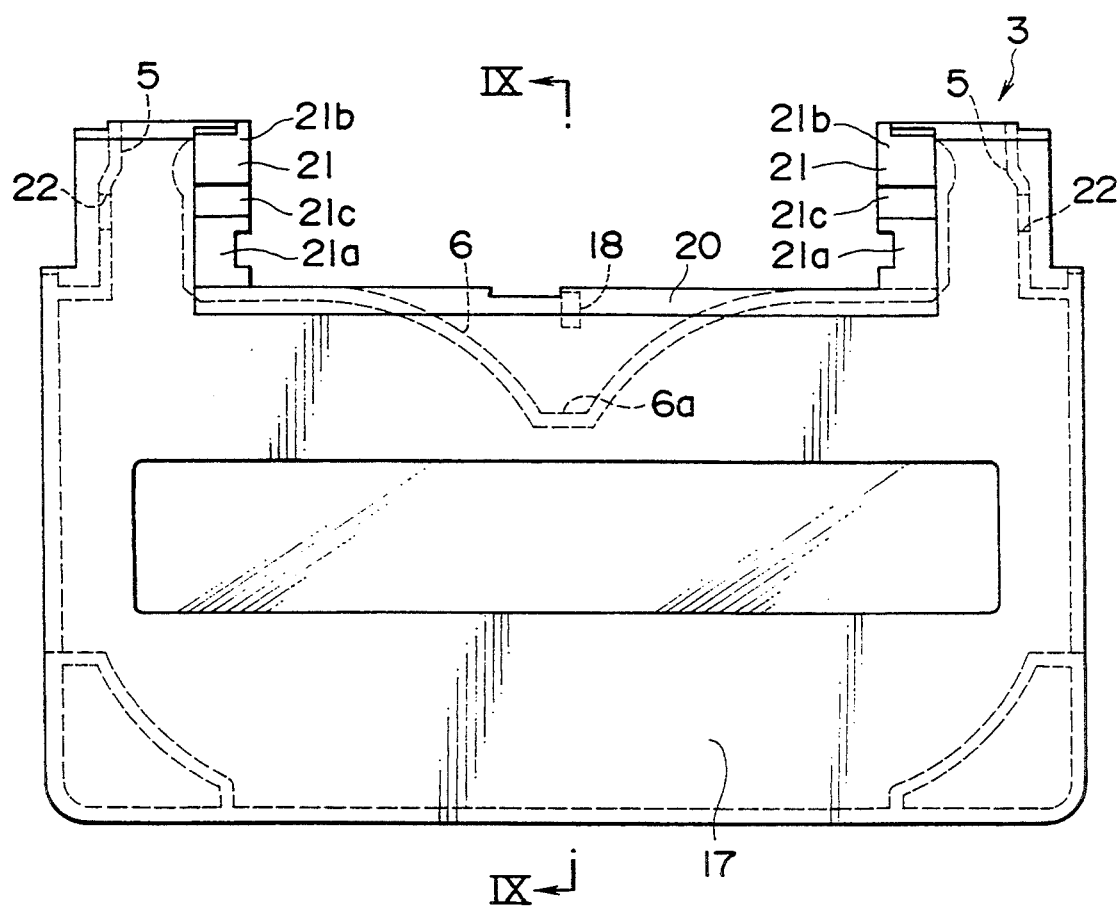
FIG. 8 is a top plan view of an upper shell of the tape cassette of FIG. 1.
Figure 9:
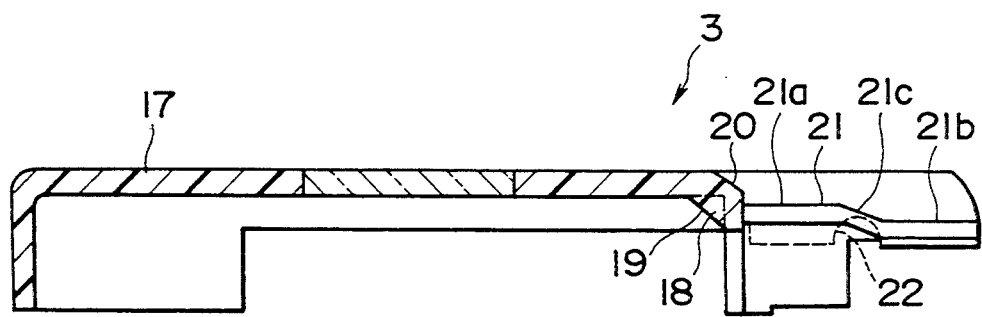
FIG. 9 is an enlarged sectional view taken along a line IX—IX shown in FIG. 8.
Figure 10:
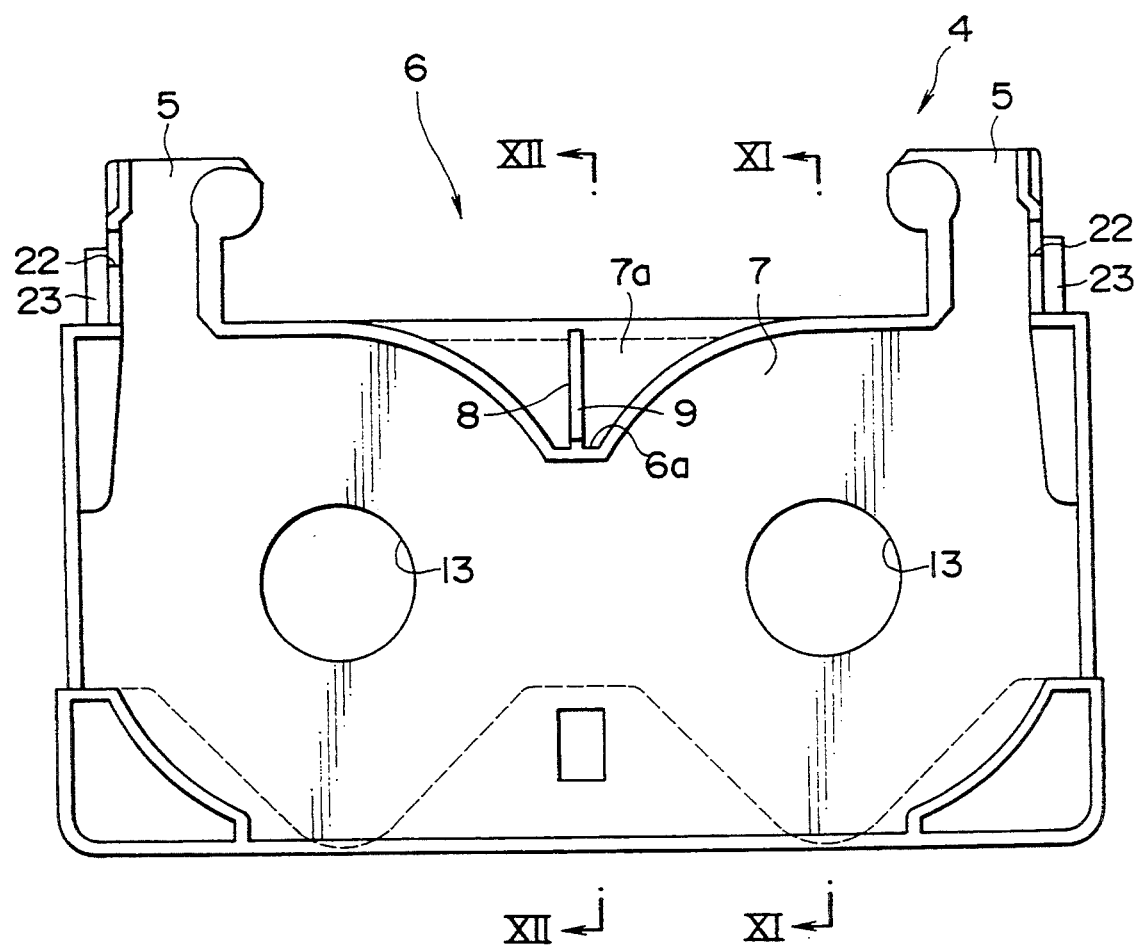
FIG. 10 is a top plan view of a lower shell of the tape cassette of FIG. 1.
Figure 11:
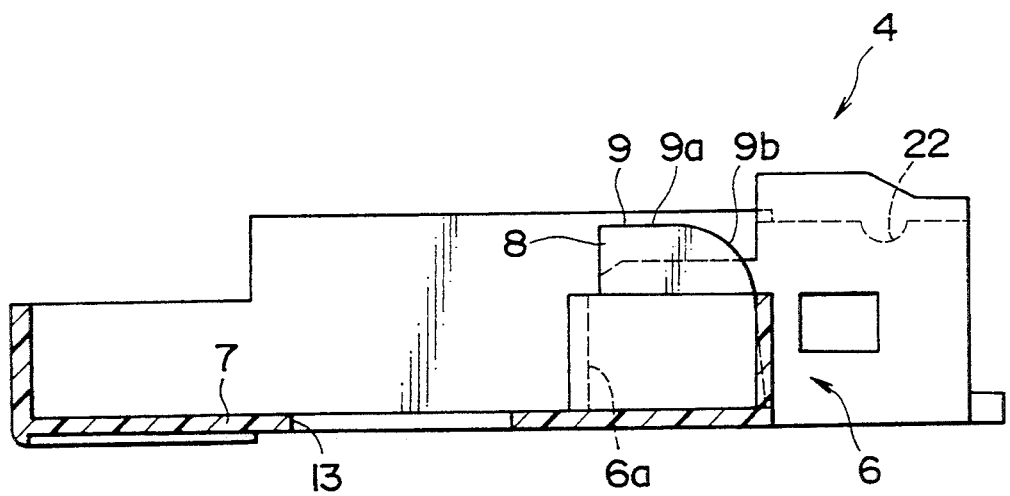
FIG. 11 is an enlarged sectional view taken along a line XI—XI shown in FIG. 10.
Figure 12:
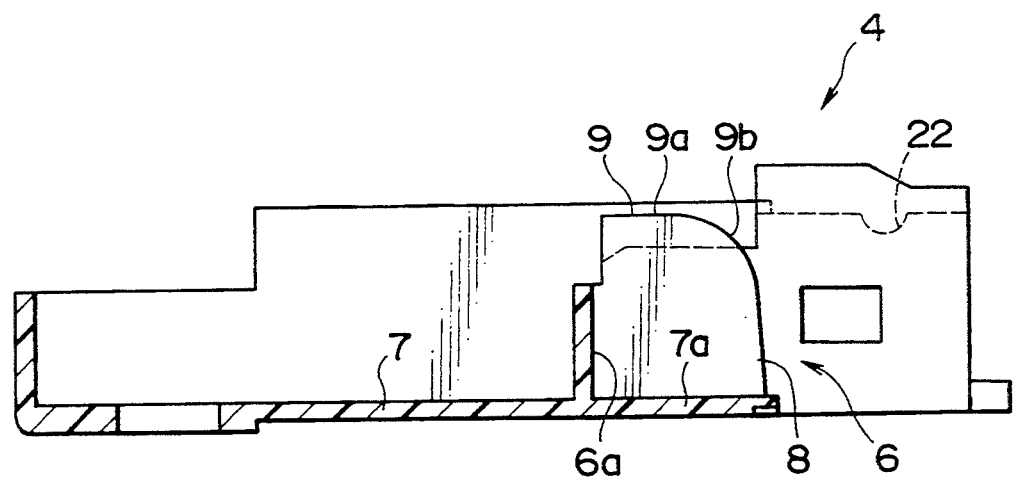
FIG. 12 Is an enlarged sectional view taken along a line XII—XII shown in FIG. 10.
Figure 13:
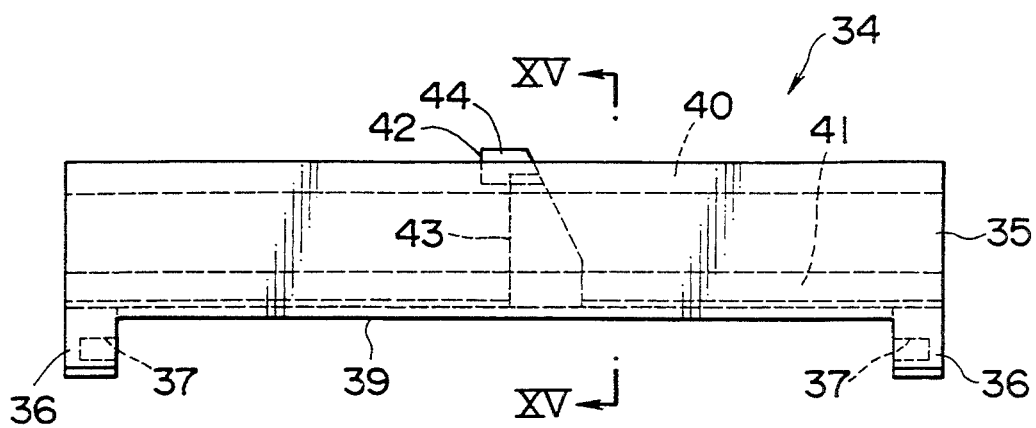
FIG. 13 is a plan view of the top lid of the tape cassette of FIG. 1.
Figure 14:
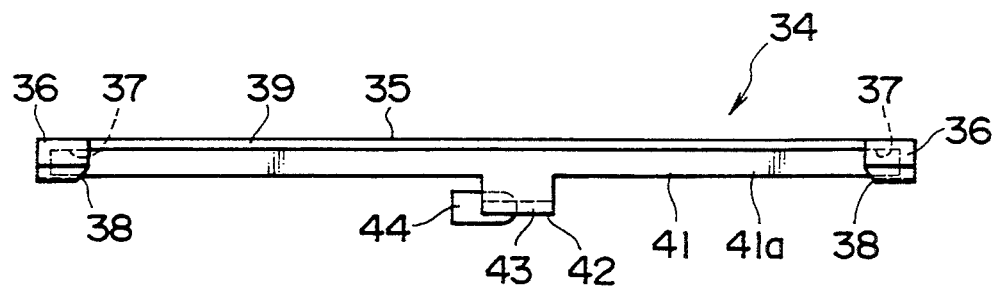
FIG. 14 is a front elevational view of the top lid of the tape cassette of FIG. 1.

Referring now to FIGS. 8, 9 and 10, a pair of hood pieces 21 are respectively provided at portions of the upper shell 3 which correspond to opposite left and right portions of the opening 6 such that the hood pieces extend toward the opening 6. Each of the hood pieces 21 include a rear half 21a and a front half 21b. Upper surfaces of the rear halves 21a are arranged at substantially the same height as the lower end of the upper or inclined face 20, while upper surfaces of the front halves 21b are arranged at a slightly lower position than the upper surfaces of the rear halves 21a. The front halves 21b and the rear halves 21a are connected by way of inclined faces 21c, which are inclined in an upward/downward direction as shown in FIG. 9.

A pair of support holes 22 are formed at front end portions of the side walls of the cassette case 2 as, for example, shown in FIGS. 8–11. A pair of upwardly directed spring anchoring steps 23 are provided on outer side faces of the front end portions of the side walls of the cassette case 2 (see, for example, FIGS. 7 and 10). The anchoring steps 23 are located downward and rearward of the support holes 22.

The tape cassette 1 further includes a main lid 24 as shown, for example, in FIGS. 1 and 2. Such main lid 24 is further illustrated in FIGS. 16, 17 and 18. As shown therein, the main lid 24 includes a front portion 25 having a plate-like form and having a length substantially equal to the length of the front wall of the cassette case 2. The main lid 24 further includes a pair of side portions 26 which extend in a rearward direction from opposite left and right end edges of the front portion 25, and a top or upper portion 27 which extends in a rearward direction from a portion of an upper edge of the front portion 25. Such portion of the upper edge of the front portion 25 from which the top portion 27 extends does not include opposite left and right end portions thereof. The length of the top portion 27 (that is, the dimension of the top portion 27 which extends in a right-left direction) is slightly smaller than the length of the opening 6. Further, the upper portion 27 extends in a rearward direction an amount which is substantially equal to one half that of the side portions 26.

A pair of support walls 28 extend upwardly from opposite left and right end portions of the upper portion 27 of the main lid 24. A pair of support pins 29 are provided on outer side faces of the support walls 28. Ends of the support pins 29 are chamfered at circumferential edges 29a thereof.

Further, an overlap piece 30 is formed at a lower portion of a rear end face of the upper portion 27 of the main lid 24 and extends rearwardly therefrom. The overlap piece 30 along with a rear end edge of an upper surface of the top portion 27 and an upper portion of the rear end face of the top portion 27 form a recess which extends over the overall length thereof.

Figure 18:
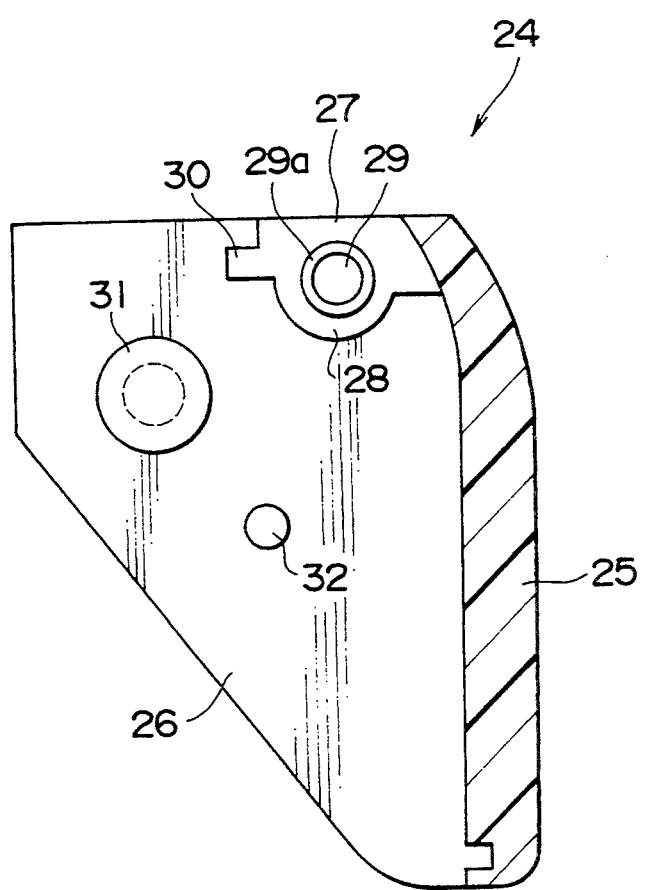
FIG. 18 is an enlarged sectional view taken along a line XVIII—XVIII shown in FIG. 16.

A pair of support pins 31 are provided at upper ends of rear end portions of inner faces of the side portions 26 of the main lid 24 so as to oppose each other. A pair of spring anchoring projections 32 are provided on the same faces as the support pins 31, but are located slightly forward and downward of the supported pins 31 as shown in FIG. 18.

The main lid 24 is pivotably supported at the front end portion of the cassette case 2 by the support pins 31 of the side portions 26 which, in turn, are supported in the support holes 22 of the cassette case 2. As a result, the main lid 24 is adapted to rotatably or pivotably moved in an upward/downward direction towards an opened or closed position as, for example, respectively shown in FIGS. 2 and 1.

As shown, for example, in FIGS. 3, 5 and 7, the tape cassette 1 further includes a pair of scissor-shaped torsion springs 33. Each of the torsion springs 33 is supported by outwardly fitting coil portions 33a around a respective one of the support pins 31 between the corresponding side portion 26 of the main lid 24 and the cassette case 2. Each of the torsion springs 33 includes an arm 33b and 33c. Each of the arms 33b resiliently contacts a corresponding one of the spring anchoring steps 23 of the cassette case 2, and each of the arms 33c resiliently contacts a corresponding one of the spring anchoring projections 32 of the main lid 24. As a result, the main lid 24 is resiliently acted upon by a pivoting force so as to cause the main lid to pivot in a clockwise direction as viewed from the right side (the right side of the tape cassette 1 is the right side thereof as viewed from the rear of the tape cassette case) toward the closed position.

The tape cassette 1 further includes a top lid 34 as, for example, shown in FIGS. 1 and 2. Such top lid 34 will now be described with reference to FIGS. 13, 14 and 15.

As shown therein, the top lid 34 includes a main portion 35 having a plate-like form and having a size sufficient to cover the top of the opening 6. Extending forwardly from opposite left and right side portions of a front end of the main portion 35a are a pair of support portions 36. The lower ends of the support portions 36 extend slightly farther in a downward direction than the lower face of the main portion 35.

A pair of fitting holes 37 are formed in the support portions 36 of the top lid 34 such that each opens to the respective opposing face of the support portion 36. Lower end portions 38 of the faces of the support portions 36 to which the fitting holes 37 open are inclined in an upward/downward direction.

An overlap piece 39 is formed from an upper half of the front end face of the main portion 35 and extends forwardly therefrom. The overlap piece 39 along with a front end edge of a lower face of the main portion 35 form a recess which extends over the overall length thereof.

Figure 15:
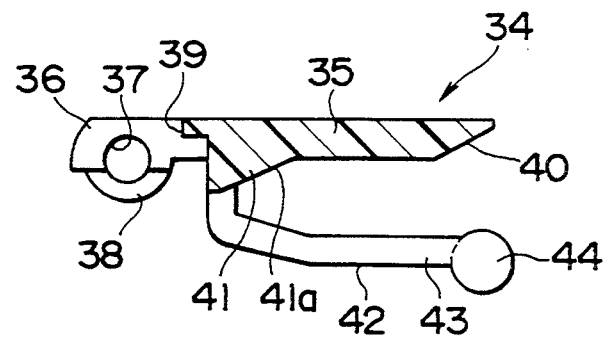
FIG. 15 is an enlarged sectional view taken along a line XV—XV shown in FIG. 13.
Figure 16:
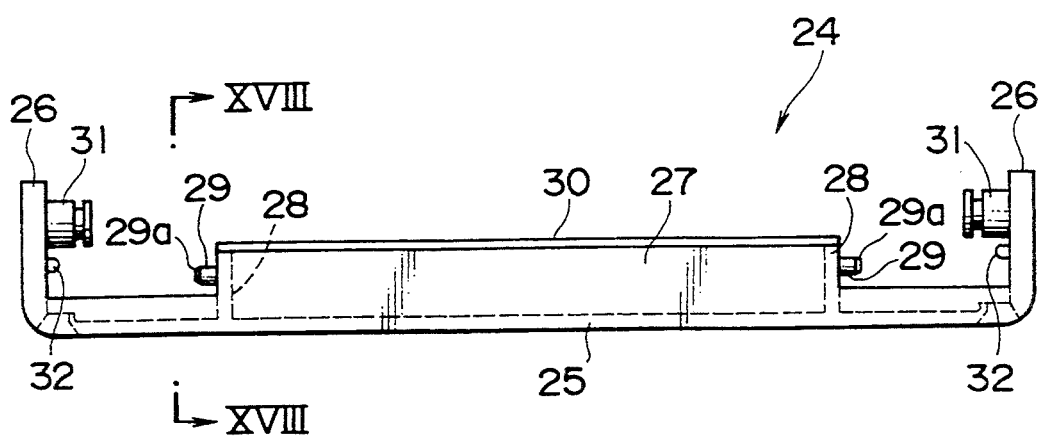
FIG. 16 is a plan view of the main lid of the tape cassette of FIG. 1.
Figure 17:
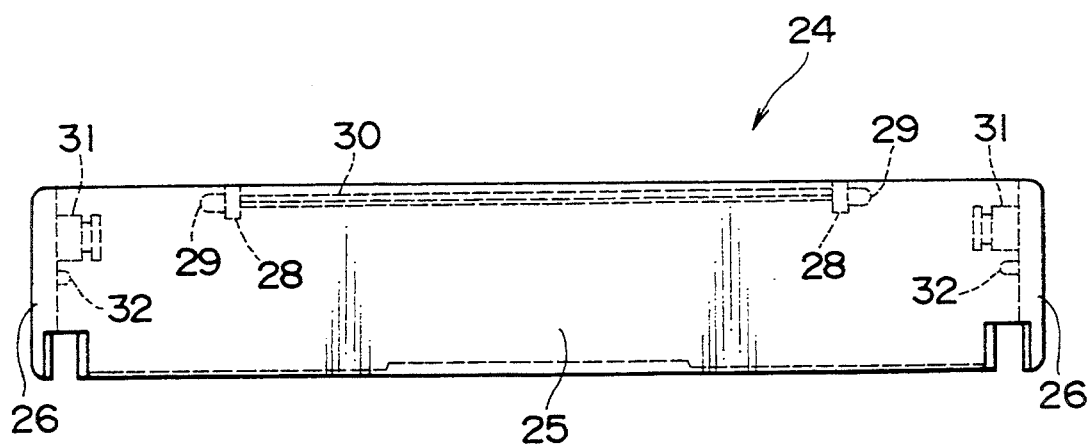
FIG. 17 is a front elevational view of the main lid of the tape cassette of FIG. 1.

The rear portion of the main portion 35 of the top lid 34 has a rear end face 40 which is inclined in an upward/downward direction as shown in FIG. 15. Such incline of the rear end face 40 has an inclination angle which is substantially equal to an inclination angle of the upper face 20 at the front end of the upper shell 3 (see, for example, FIG. 4).

A wedge-shaped rib 41 is formed at a front end portion of the lower face of the main portion 35. The rib 41 has a lower face which is upwardly inclined towards the rear as shown in FIG. 15. The inclination or slope of the lower face 41a is rather moderate as compared to that of the rear end face 40.

A control portion 42 is formed on the main portion 35 of the top lid 34. More specifically, the control portion 42 extends from a substantially central portion of a front end portion of the lower face of the main portion 35 in a left/right direction. The control portion 42 is bent or formed in an L-shape and arranged such that one portion of the L extends rearwardly. The control portion includes a horizontal portion 43 which extends in a horizontal manner and which is located at a predetermined distance from the main portion 35 of the top lid 34 (see, for example, FIG. 15). A shaft 44 is formed at an end of the horizontal portion 43 and extends in a right-/left direction.

The top lid 34 is pivotably supported on the main lid 24 and is adapted to move with the main lid 24 as hereinafter more fully described.

More particularly, lower portions of the portions 38 of the support portions 36 of the top lid 34 initially contact the chamfered faces 29a at the ends of the support pins 29 of the main lid 24. When the top lid 34 is moved, the top lid 34 may be resiliently deformed and the portions 38 and the chamfered faces 37 may slip on each other. The support pins 29 of the main lid 24 are fitted into the fitting holes 37 of the top lid 34. As a result, the top lid 34 is supported for pivotal motion on the main lid 24.

When the main lid 24 and the top lid 34 are in their respective closed positions as for example shown in FIG. 1, the cam shaft 44 of the top lid 34 is positioned between a front end portion of the cam edge 9 of the lower shell 4 and a front end portion of the cam edge 19 of the upper shell 3 as, for example, shown in FIG. 4. As is to be appreciated, in this position, even if an upward force is applied to the top lid 24, such force may not cause the top lid to be pivotably moved. That is, upon applying such force, the cam shaft 44 will contact the cam edge 19 of the upper shell 3 and since it cannot move any further upward the top lid 34 may not be pivotably moved. Thus, the top lid 34 may not be pivotably moved without pivotal movement of the main lid 24, as hereinafter more fully described.

When the main lid 24 and the lop lid 34 are in their respective closed positions as, for example, shown in FIGS. 1 and 4, the front portion 25 of the main lid 24 covers the front of the opening 6; the main portion 35 of the top lid 34 and the upper portion 27 of the main lid 24 cover the top of the opening 6; and the shutter 14 covers the bottom of the opening 6, thereby substantially completely covering or closing the opening 6. Further, in such closed positions as for example shown in FIG. 4, the overlap piece 30 of the top portion 27 of the main lid 24 and the overlap piece 39 of the top lid 34 are arranged so as to overlap each other or to be placed one on top of the other; the face 40 at the rear end of the main portion 35 of the top lid 34 is arranged so as to overlap the face 20 at the front end of the upper shell 3; and the opposite left and right side portions and the support portions 36 of the main portion 35 of the top lid 34 are arranged so as to overlap the hood pieces 21 of the upper shell 3. These further arrangements enhance the effective closing of the top of the opening 6.

If the main lid 24 is pivoted towards its opened position, the pivotal support pins 29 are moved rearwardly while being displaced upwardly due to the difference between the positions of the pivotal support points (support pins 31) of the main lid 24 and the pivotal support points (support pins 29) of the top lid 34. As a result of the pivotable opening movement of the main lid 24, a force is applied to the top lid 34 in a substantially rearward direction. As described below, such force causes the top lid 34 to move to its opened position as, for example, shown in FIGS. 2, 6 and 7.

During the initial movement of the top lid 34, the face 40 of the top lid 34 is moved rearwardly while being moved upwardly along the upper face 20 of the top wall 17 of the upper shell 3. After the top lid 34 starts moving rearwardly, the cam shaft 44 contacts and is guided by the cam edge 9 of the lower shell 4 so as to move along the cam edge 9, thereby preventing the lower face of the main portion 35 of the top lid 34 from rubbing or sliding on the upper face of the upper shell 3. Upon reaching the opened position shown in FIG. 6, the face 41a of the rib 41 of the top lid 34 may contact the upper face 20 of the top wall 17 of the upper shell 3. Thus, the top lid 34 is moved upwardly and rearwardly towards its opened position while the main lid 24 is pivotably moved to its opened position.

Therefore, during the opening movement of the top lid 34, the cam shaft 44 is moved under the guidance of the cam edge 9 of the cam plate 8 formed on the lower shell 4 so that the main portion 35 of the top lid 34 may be moved along the upper face of the top wall 17 of the upper shell 3 of the cassette case 2 without rubbing or sliding on the same. As a result, the position of the top lid 34 is controlled throughout the entire movement thereof.

During a closing operation, the top lid 34 is moved in a manner opposite to that described above with reference to the opening operation.

Briefly, during the closing operation, the cam shaft 44 of the top lid 34 is moved along the lower face of the upper wall 17 of the upper shell 3. Such movement of the cam shaft occurs for more than one half of the closing operation. Thereafter, the cam shaft 44 is moved downwardly by the cam edge 19 of the cam portion 18 of the upper shell 3. As a result, the top lid 34 is moved to its closed position, as shown for example in FIGS. 1, 4 and 5, while the position of the top lid is controlled throughout so as to avoid rubbing or sliding between lower face of the main portion 35 of the top lid 34 and the upper face of the top wall 17 of the upper shell 3 of the cassette case 2.

A tape cassette 1' according to a second embodiment of the present invention will now be described with reference to FIGS. 19 to 23. In the interest of brevity, in describing the second embodiment, only differences between the first and second embodiments will be described and illustrated in the figures. With the exception of the differences described hereinafter and illustrated in FIGS. 19–23, the tape cassette 1' is similar to the tape cassette 1. Accordingly, the elements and/or features of the tape cassette 1' not specifically described or illustrated are substantially similar to those of the tape cassette 1.

As shown in FIGS. 19–23, the tape cassette 1' generally includes an upper shell 17, a top lid 51, a main lid 52 and a back lid 57 which are arranged as shown therein and as described below.

Figure 19:
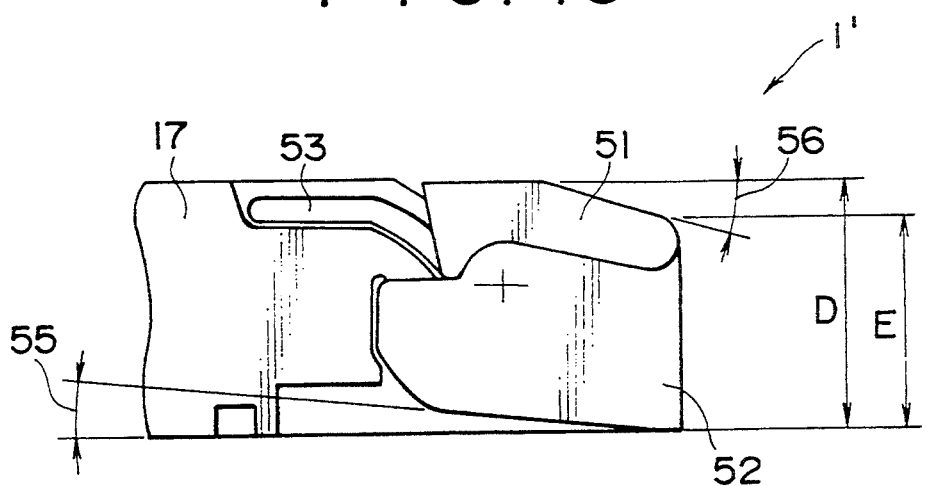
FIG. 19 is an enlarged side elevational view of a tape cassette having a main lid and top lid arranged in their respective closed positions in accordance with a second embodiment of the present invention.
Figure 21:
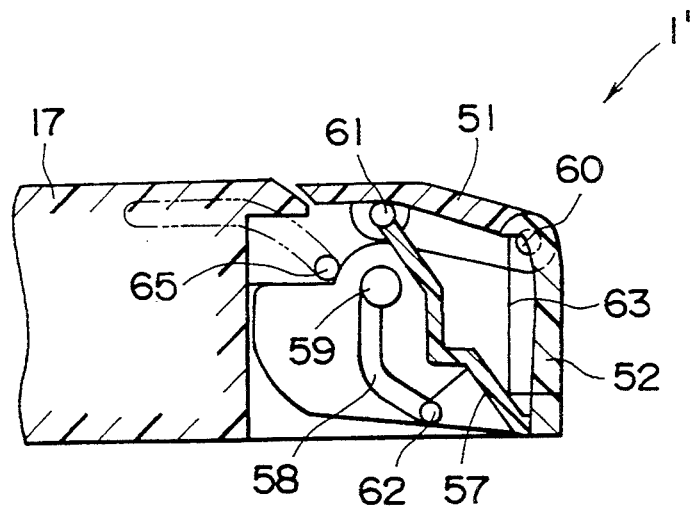
FIG. 21 is a partial sectional view of the tape cassette of FIG. 19.

Referring to FIGS. 19 and 21, a guide groove or slot 53 having an inclined portion and a flat portion is provided at a front upper portion of the upper shell 17. A pivot 65 is provided at an end portion of the top lid 51.

A pivot 61 is provided substantially at the center of the top lid 51, while another pivot 60 is provided at a front end portion of the top lid 51. The back lid 57 and main lid 52 are respectively disposed on the pivots 61 and 60 and arranged so as to hold a magnetic tape 63 therebetween. A substantially curved guide groove or slot 58 is formed so as to extend from a front lower portion to a front central portion of the upper shell 17. A pin 62 coupled to the back lid 57 is adapted to engage the guide groove or slot 58.

Figure 20:
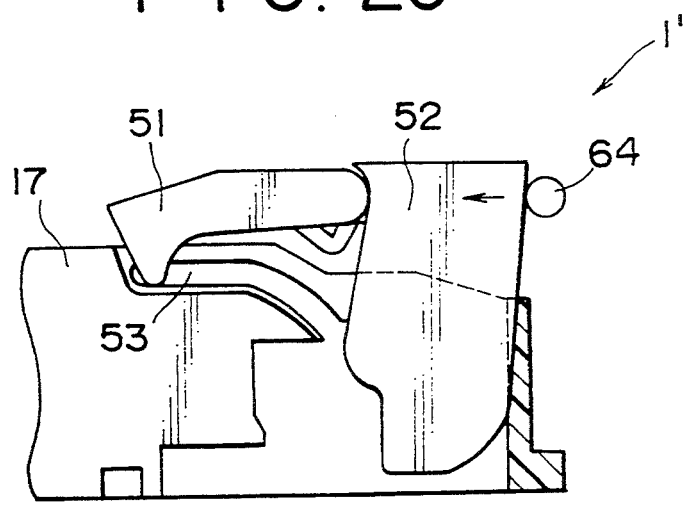
FIG. 20 is an enlarged sectional view of the tape cassette of FIG. 19 with the main lid and the top lid in their respective opened positions.

A lower portion of the main lid 52 is inclined at a predetermined inclination angle 55 (which may have a value of approximately 5 degrees) so as to avoid contact with the magnetic tape 63 (as seen from FIG. 20). An intermediate portion to a front end portion of the top lid 51 is inclined at a predetermined inclination angle 56 (which may have a value of approximately 15 degrees) with respect to a horizontal plane. In other words, a difference in height D-E is provided between them. Such inclination angle of 55 degrees or height difference facilitates the insertion of the tape cassette 1' into a recording and reproducing apparatus (not shown).

When the tape cassette 1' is inserted into the recording/reproducing apparatus, the top lid 51 and the main lid 52 are pivotably moved to their respective opened positions. Such movement will now be described.

Figure 22:
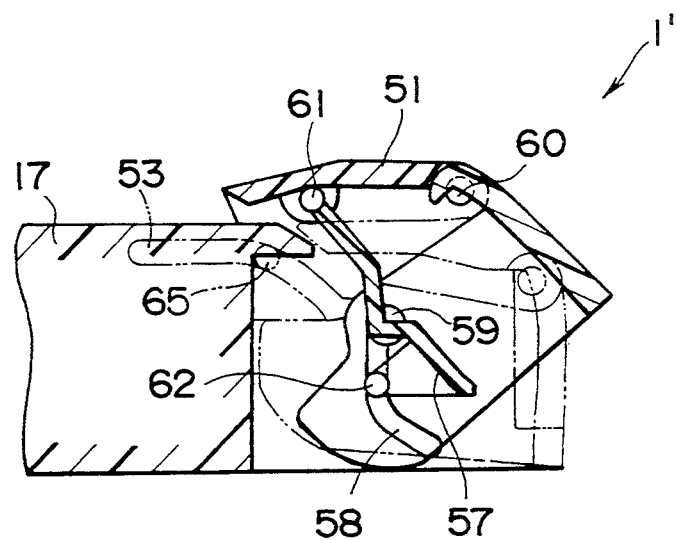
FIG. 22 is a partial enlarged sectional view of the tape cassette of FIG. 19 with the main lid and the top lid in an intermediate position between their respective closed and opened positions.

FIG. 22 illustrates respective intermediate positions of the top lid 51 and the main lid 52 as they are proceeding toward their opened positions. More specifically, as the cassette case 1' is loaded into the recording and reproducing apparatus, an end portion of the main lid 52 is engaged with an engaging portion 64 (FIG. 20) so as to cause the main lid to be pivoted upwardly about support pins 59 towards the upper shell 17. As such pivotal motion proceeds, the top lid 51 and the back lid 57, which are respectively engaged by the pivots 60 and 61, are moved to their respective intermediate positions.

Figure 23:
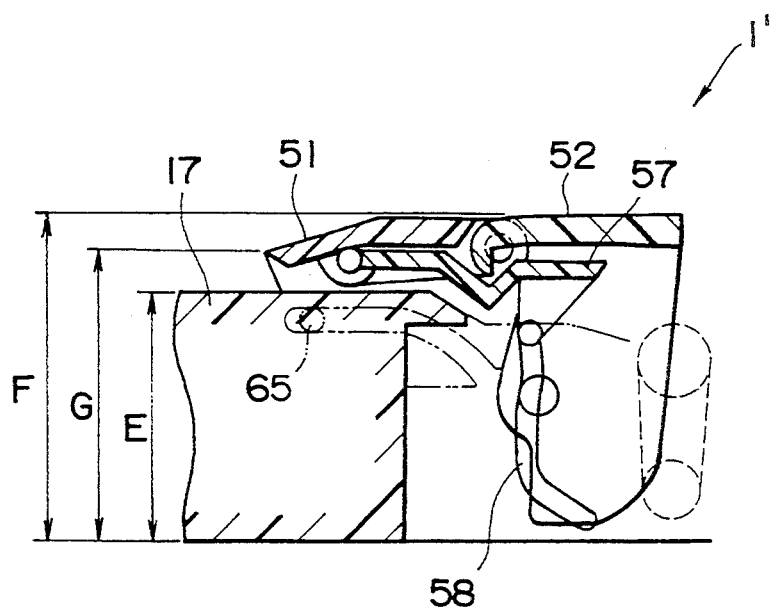
FIG. 23 is a partial sectional view of the tape cassette of FIG. 19 with the main lid and the top lid in their respective opened positions.
Figure 24:
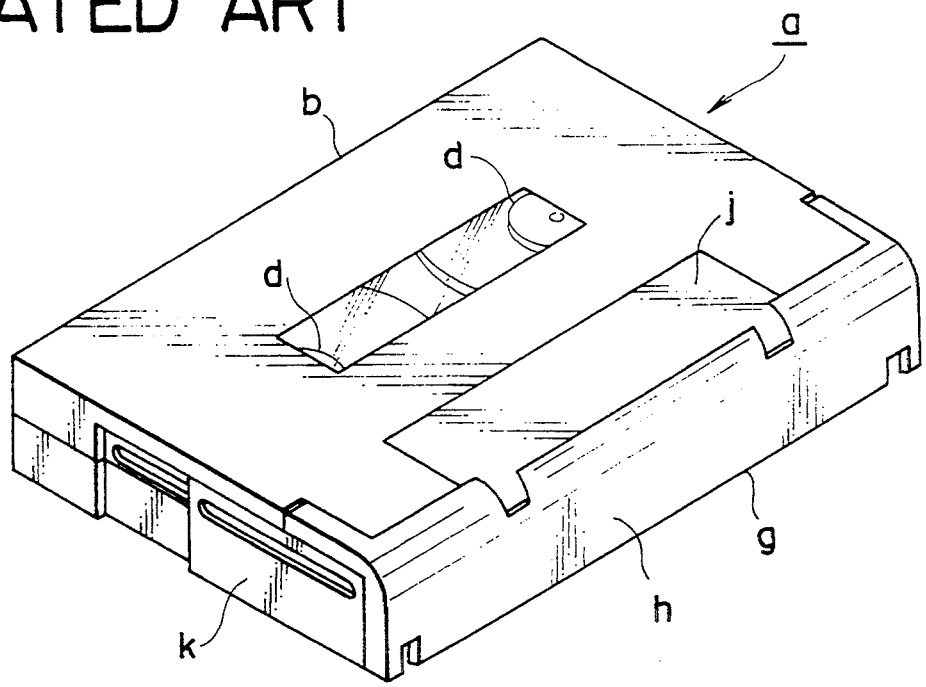
FIG. 24 is a perspective view of a related tape cassette having a main lid and a top lid arranged in their respective closed positions.
Figure 25:
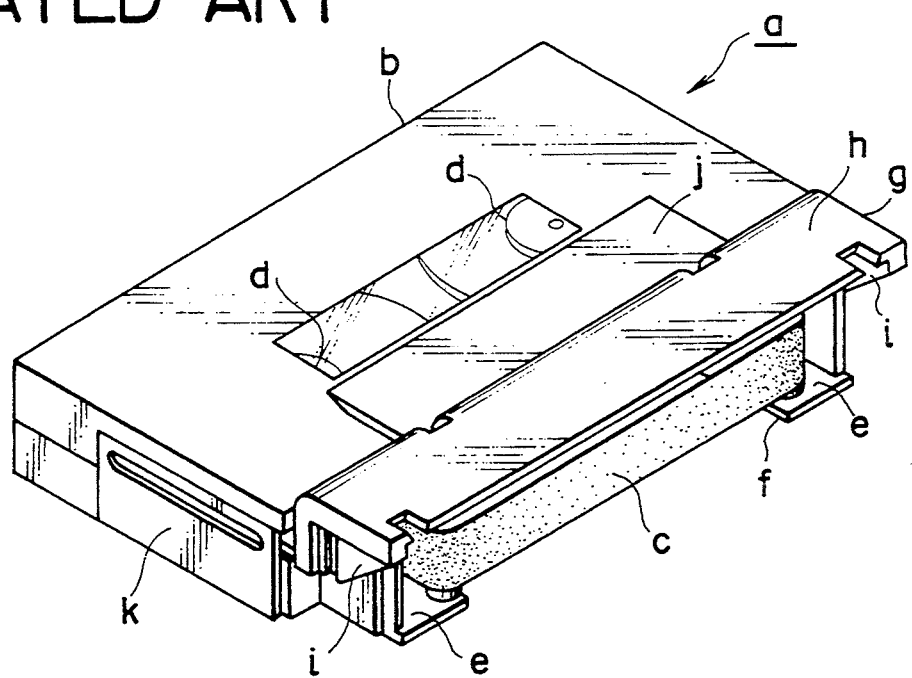
FIG. 25 is a perspective view of the tape cassette of FIG. 24 with the main lid and the top lid in their respective opened positions.

FIGS. 20 and 23 illustrate the opened positions of the main lid 52, the top lid 51 and the back lid 57. In such opened positions, as shown in FIG. 23, the main lid 52, the back lid 57 and the top lid 51 are held substantially horizontally with respect to an upper surface of the upper shell 17 of the cassette case. An inclined end portion of the top lid 51 is located at a height G, which is between a height F from the bottom face of the lower shell to the main lid and a height E of the upper shell 17. The back lid 57 is disposed between the top lid 51 and the upper shell 17. In its opened position, the main lid 51 is not overlapped at the portion corresponding to the inclination angle of 55 degrees.

Thus, the top lid 51 and the back lid 57 are moved upwardly and rearwardly toward their respective opened positions as the main lid 52 is pivotably moved to its opened position.

Further, during such opening movement, the top lid 51 is moved along the upper face of the upper shell 17 of the cassette case 2, while the pin 65 is moved under the guidance of the guide groove or slot 53 formed on the upper shell 3. As a result, the position of the top lid 51 is controlled throughout the entire movement.

The closing operation is performed in a manner substantially opposite to the opening operation and, accordingly, will not be described herein.

Thus, the present invention provides a tape cassette in which the top lid may be moved during an opening or closing operation so as to avoid sliding or rubbing on an upper surface of the cassette case. As a result, damage to the top lid and/or the cassette case is avoided and the generation of a powder-like substance from such sliding is prevented.

Although illustrative embodiments of the present invention have been described in detail herein, it is to be understood that this invention is not limited to these embodiments, and that modifications and variations thereto may be affected therein by one skilled in the art without departing from the scope and spirit of the invention as defined by the appended claims.

What is claimed is:

1. A tape cassette comprising:
   a pair of tape reels having a recording tape wound therebetween;
   a cassette case holding said pair of tape reels therein and having an opening for providing access to said recording tape, said cassette case further having an upper wall and only one cam located in a central portion of said cassette case which is adjacent to said opening;
   a main lid pivotably mounted on opposite side faces of said cassette case for covering at least a front portion of said opening when said main lid is in a closed position and exposing said at least front portion of said opening when said main lid is in an opened position;
   a top lid pivotably mounted on said main lid so as to be movable therewith, said top lid being located so as to cover an upper portion of said opening when said main lid is in said closed position and being at least partially located on top of an upper surface of said upper wall of said cassette case when said main lid is in said opened position; and
   guide means, including a cam shaft and only one guide groove formed of an outer edge of said cam and a horizontal portion and an inclined portion of an inner surface of said upper wall of said cassette case, for guiding said top lid over said upper surface of said upper wall of said cassette case when said main lid is opened and closed by having said cam shaft contact at least one of said outer edge of said cam and said horizontal portion and said inclined portion of said inner surface of said upper wall so as to prevent an inner surface of said top lid from sliding along said upper surface of said upper wall;
   said recording tape being accessible when said main lid is in said opened position and being substantially covered when said main lid is in said closed position.

2. A tape cassette according to claim 1, wherein said cam shaft is coupled to said top lid, and wherein said top lid is moved in a substantially rearward direction when said main lid is opened and is moved in a substantially forward direction when said main lid is closed.

3. A tape cassette according to claim 2, wherein said cassette case includes an upper shell and a lower shell and wherein said inclined portion of said guide groove extends from a front lower end portion of said cassette case toward an upper rear portion thereof and said horizontal portion of said guide groove is contiguous to said inclined portion.

4. A tape cassette according to claim 3, wherein a rear end portion of said top lid is held at a height which is between a first height from a bottom face of said upper shell to said main lid and a second height from said bottom face of said upper shell to an upper portion of said upper shell when said main lid is in said opened position.

5. A tape cassette according to claim 4, further comprising a back lid coupled to a rear portion of said top lid and adapted for pivotal motion therewith, said back lid being arranged such that said recording tape is held between said back lid and said main lid.

6. A tape cassette comprising:
   a pair of tape reels having a recording tape wound therebetween;
   a cassette case holding said pair of tape reels therein and having an opening for providing access to said recording tape, said cassette case including an upper shell and a lower shell;
   a main lid pivotably mounted on opposite side faces of said cassette case for covering at least a front portion of said opening when said main lid is in a closed position and exposing said at least front portion of said opening when said main lid is in an opened position;
   a top lid, including means for contacting, pivotably mounted on said main lid so as to be movable therewith, said top lid being located so as to cover an upper portion of said opening when said main lid is in said closed position and being at least partially located on top of an upper surface of said cassette case when said main lid is in said opened position, in which a rear end portion of said top lid is held at a height which is between a first height from a bottom face of said upper shell to said main lid and a second height from said bottom face of said upper shell to an upper portion of said upper shell when said main lid is in said opened position;
   a back lid including a back lid guide coupled to a rear portion of said top lid and adapted for pivotal motion therewith, said back lid being arranged such that said recording tape is held between said back lid and said main lid; and
   guide means arranged in said cassette case and including a first guide groove having an inclined portion extending from a front lower end portion of said cassette case toward an upper rear portion thereof and a flat portion contiguous to said inclined portion and a second guide groove located on a side face of said cassette case for guiding said top lid over said upper surface of said cassette case when said main lid is opened and closed so as to prevent an inner surface of said top lid from sliding along said upper surface of said cassette case and for guiding said back lid guide of said back lid by said second guide groove so as to move said back lid to an upper portion of said upper shell;
   said top lid being moved in a substantially rearward direction when said main lid is opened and being moved in a substantially forward direction when said main lid is closed while the contacting means contacts said guide means,
   said recording tape being accessible when said main lid is in said opened position and being substantially covered when said main lid is in said closed position.

7. A tape cassette according to claim 6, wherein movements of said top lid and said back lid are controlled so as to move upwardly after a relatively small time period has passed since said main lid began to open.

8. A tape cassette according to claim 6, wherein said back lid is arranged between said top lid and said upper portion of said upper shell when said main lid is in said opened position.

9. A tape cassette according to claim 8, wherein said back lid is arranged so as to be substantially parallel to said main lid and said top lid which are substantially arranged in a row when said main lid is in said opened position.

10. A tape cassette according to claim 9, wherein said top lid and said back lid are arranged so as to avoid contact with said upper shell.

11. A tape cassette comprising:
- a pair of tape reels having a recording tape wound therebetween;
- a cassette case holding said pair of tape reels therein and having an opening for providing access to said recording tape, said cassette case including an upper shell and a lower shell;
- a main lid pivotably mounted on opposite side faces of said cassette case for covering at least a front portion of said opening when said main lid is in a closed position and exposing said at least front portion of said opening when said main lid is in an opened position;
- a top lid pivotably mounted on said main lid so as to be movable therewith, said top lid being located so as to cover an upper portion of said opening when said main lid is in said closed position and being at least partially located on top of an upper surface of said cassette case when said main lid is in said opened position;
- a back lid including a back lid guide coupled to a rear portion of said top lid and adapted for pivotal motion therewith; and
- guide means arranged in said cassette case and including a first guide groove having an inclined portion and a flat portion contiguous to said inclined portion and a second guide groove located on a side face of said cassette case for guiding said top lid over said upper surface of said cassette case when said main lid is opened and closed so as to prevent an inner surface of said top lid from sliding along said upper surface of said cassette case and for guiding (aid back lid guide) of said back lid by said second guide groove so as to move said back lid to an upper portion of said upper shell;
- said recording tape being accessible when said main lid is in said opened position and being substantially covered when said main lid is in said closed position.

* * * * *